(12) United States Patent
Chen et al.

(10) Patent No.: US 7,254,037 B2
(45) Date of Patent: Aug. 7, 2007

(54) MOUNTING APPARATUS FOR MOTHERBOARDS

(75) Inventors: Yun-Lung Chen, Tu-Cheng (TW); Guo-Hua Chen, Shenzhen (CN)

(73) Assignees: Hong Fu Jin Precision Industry (Shenzhen) Co., Ltd., Bao-an District, Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 443 days.

(21) Appl. No.: 10/989,701

(22) Filed: Nov. 16, 2004

(65) Prior Publication Data

US 2005/0168927 A1    Aug. 4, 2005

(30) Foreign Application Priority Data

Apr. 2, 2004    (TW) .............................. 93205032 U

(51) Int. Cl.
*H05K 5/00* (2006.01)
(52) U.S. Cl. ........................ 361/726; 361/759
(58) Field of Classification Search ................ 361/726
See application file for complete search history.

(56) References Cited

U.S. PATENT DOCUMENTS

| | | | | |
|---|---|---|---|---|
| 5,490,038 A | * | 2/1996 | Scholder et al. | 361/759 |
| 5,801,928 A | * | 9/1998 | Burstedt et al. | 361/801 |
| 5,973,926 A | * | 10/1999 | Sacherman et al. | 361/759 |
| 6,308,394 B1 | * | 10/2001 | Boe | 29/450 |
| 6,362,978 B1 | * | 3/2002 | Boe | 361/825 |
| 6,424,540 B1 | * | 7/2002 | Chen et al. | 361/759 |
| 6,470,555 B2 | | 10/2002 | Boe | |
| 6,930,892 B2 | * | 8/2005 | Barringer et al. | 361/801 |
| 7,072,176 B2 | * | 7/2006 | Lin et al. | 361/685 |
| 2004/0125575 A1 | * | 7/2004 | Chen et al. | 361/759 |

\* cited by examiner

*Primary Examiner*—Anatoly Vortman
*Assistant Examiner*—Anthony Q. Eedwards
(74) *Attorney, Agent, or Firm*—Morris Manning & Martin LLP; Tim Tingkang Xia, Esq.

(57) ABSTRACT

A mounting apparatus for mounting a motherboard (10) includes a base (200) with a number of standoffs (210) formed thereon, a driving member (130), an operating member (110) and a supporting tray (20) with a number of mounting holes (27) defined therein. The driving member is slidably attached to the base and a driving shaft (144) is formed thereon. The operating member is pivotally attached to the base with a first cutout (114) and a second cutout (116) defined therein. The supporting tray is secured on a bottom surface of the motherboard with a post (42) formed thereunder. The driving shaft and the post is respectively engaged in the first cutout and the second cutout. After the standoffs are received in corresponding mounting holes, the motherboard is assembled or disassembled by pushing or pulling the driving member.

21 Claims, 5 Drawing Sheets

MOUNTING APPARATUS FOR MOTHERBOARDS

BACKGROUND OF THE INVENTION

1. Field of the Invention

The present invention relates to mounting apparatuses, and particularly to a mounting apparatus that readily attach a motherboard onto a computer chassis.

2. Description of the Related Art

Conventional methods of installing a circuit board, such as a motherboard, to a computer chassis use small hardware devices such as screws or rivets. When using such objects to mount the motherboard to a computer chassis, an appropriate tool must be used, e.g., a screwdriver or riveter. Using tools to connect these components may damage the motherboard, if the tool slips during the assembly process. Additionally, the process of mounting the motherboard to the chassis may require working in tight space or require the use of small hardware and tools, which can make the assembly process difficult. Thus, these motherboard installation methods are unduly laborious and time-consuming.

An improvement in the mounting of a motherboard in a computer chassis is illustrated and described in U.S. Pat. No. 6,470,555. In this patent, a method of removably mounting a motherboard is disclosed. The method comprises positioning a first fastener of a mounting device adjacent a mounting slot in the chassis, inserting the first fastener of the mounting device through the mounting slot in the chassis, releasing the mounting device so that the first fastener clamps onto the chassis through the mounting slot, positioning a second fastener of the mounting device adjacent a mounting hole on the motherboard, and inserting the second fastener of the mounting device in to the mounting hole until the second fastener clasps onto the motherboard through the mounting hole.

However, the motherboard is directly assembled and disassembled onto the chassis when using the above method. The operating space for mounting the motherboard is limited; so that components on the motherboard or on the chassis adjoin the motherboard is prone to be damaged.

Thus an improved mounting apparatus for motherboards that overcomes the above-mentioned problems is desired.

SUMMARY OF THE INVENTION

Accordingly, an object of the present invention is to provide a mounting apparatus comprising a locking device, the locking device readily and conveniently secures a motherboard to a computer base and allows ready detachment therefrom.

To achieve the above-mentioned object, a mounting apparatus for mounting a motherboard comprises a base, a driving member, an operating member and a supporting tray. A plurality of standoffs is formed on the base and each comprises a head portion and a neck portion. The driving member is slidably attached to the base and a driving shaft is formed thereon. The operating member is pivotally attached to the base. A first cutout and a second cutout are defined in the operating member, respectively. The driving shaft of the driving member is engaged in the first cutout. The supporting tray is secured on a bottom surface of the motherboard with a post formed thereunder. The post is accommodated in the second cutout. The supporting tray comprises a plurality of first mounting holes and each comprises a first neck portion and a first retaining hole. The motherboard comprises a plurality of second mounting holes and each comprises a second neck portion and a second retaining hole. Wherein after the head portions of the standoffs on the base are received in corresponding first and second accommodating holes, the driving member is pushed towards an inner space of the base, the motherboard is attached to the base when the neck portions of the standoffs are received in corresponding first and second retaining holes. A diameter of the head portion is smaller than that of the first and second accommodating holes, and is greater than that of the first and second retaining holes, and a diameter of the neck portion is smaller than that of the first and second retaining hole.

Other objects, advantages and novel features of the present invention will be drawn from the following detailed description of a preferred embodiment of the present invention with attached drawings, in which:

DETAILED DESCRIPTION OF THE INVENTION

Figure 1:
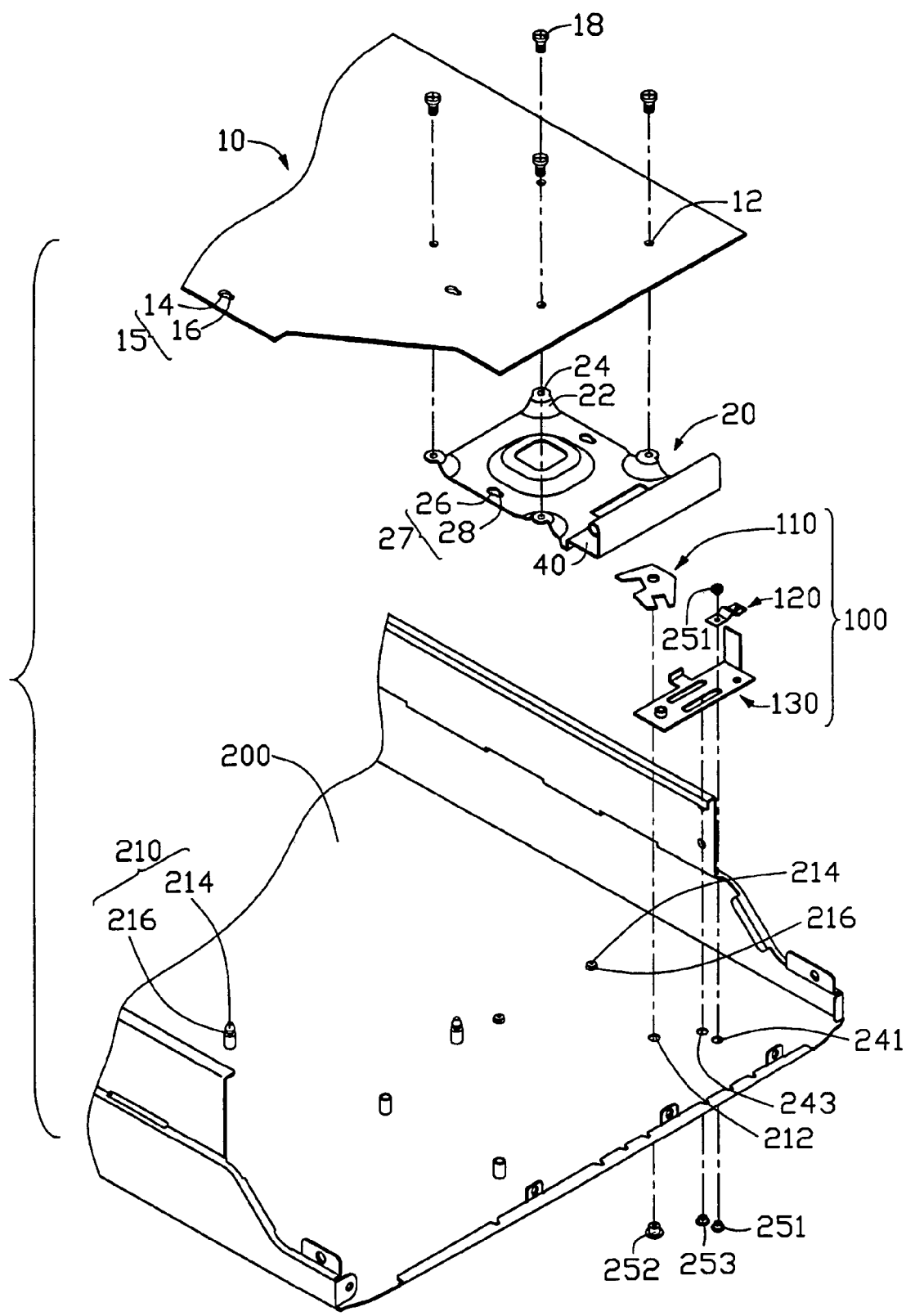
FIG. 1 is an exploded, isometric view of a mounting apparatus in accordance with a preferred embodiment of the present invention together with a motherboard, the mounting apparatus comprising a base, a locking device and a supporting tray.
Figure 2:
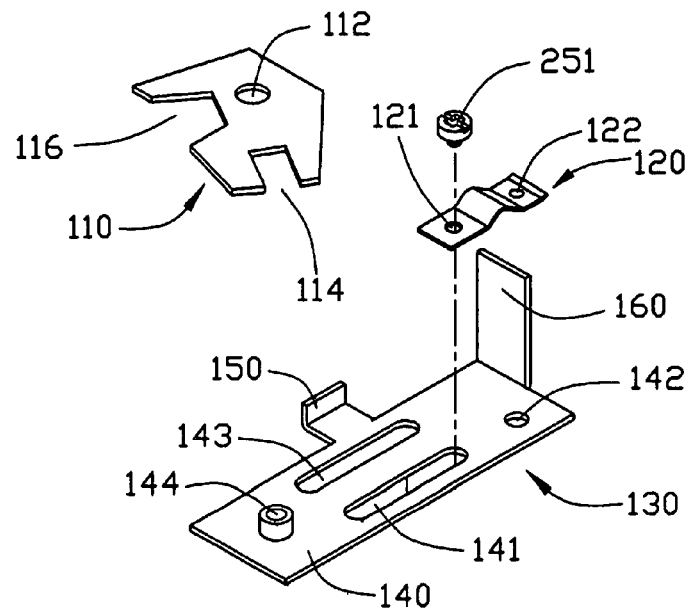
FIG. 2 is an enlarged view of the locking device of FIG. 1.
Figure 3:
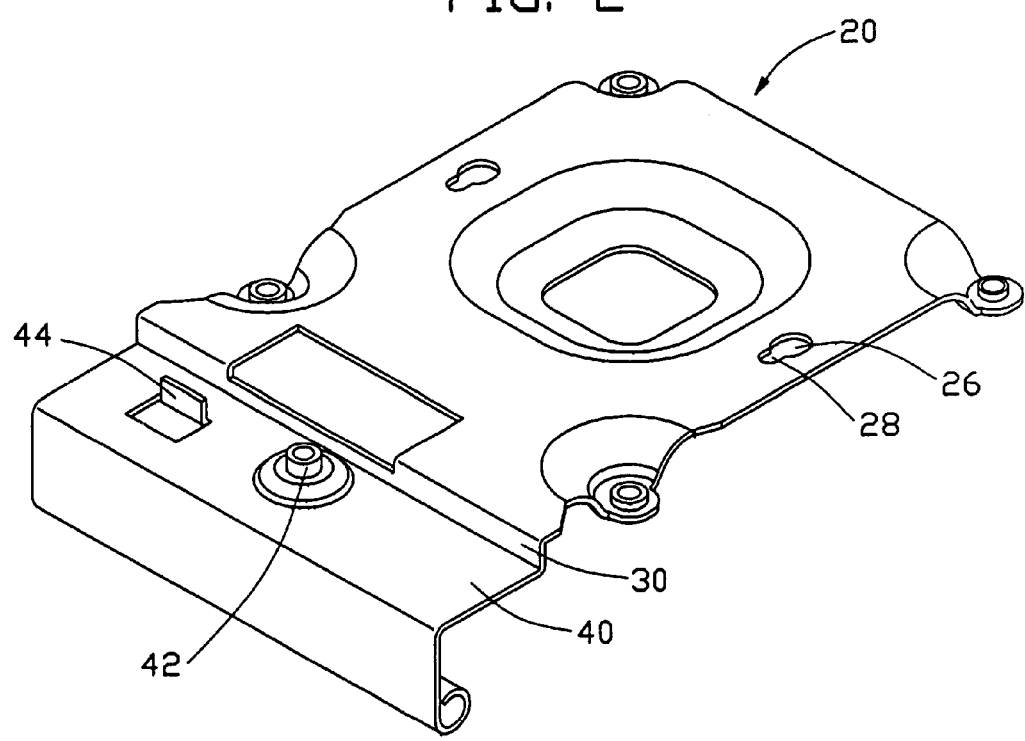
FIG. 3 is a back view of the supporting tray of FIG. 1.

Referring to FIGS. 1 to 3, a mounting apparatus in accordance with the preferred embodiment of the present invention is used to assemble and disassemble a motherboard 10 on a computer chassis. The mounting apparatus comprises a supporting tray 20, a locking device 100, and a base 200.

The motherboard 10 defines a plurality of first mounting holes 15 and four fixing holes 12 therein. Each first mounting hole 15 is generally calabash-shaped and comprises a first accommodating hole 14 and a first retaining hole 16.

The supporting tray 20 is secured on a bottom surface of the motherboard 10 and is integrally formed from a rectangular planar panel. Two pairs of platforms 22 are symmetrically projected from the supporting tray 20. A fixing hole 24 is defined in each platform 22 corresponding to the fixing hole 12 of the motherboard 100. A corresponding number of screws 18 are used to cooperate with the fixing holes 12, 24 to secure the motherboard 10 to the motherboard tray 20. A first bent piece 30 is bent upwardly from a front portion of the supporting tray 20. A second bent piece 40 is bent outwardly from a free edge of the first bent piece 30. A post 42 and a stopping piece 44 are respectively formed downwardly from the second bent piece 42. A plurality of second mounting holes 27 is defined in the supporting tray 20. Each second mounting hole 27 is generally calabash-shaped and comprises a second accommodating hole 26 and a second retaining hole 28.

The locking device 100 comprises an operating member 110, a locking strip 120 and a driving member 130. The operating member 110 is an irregular-shaped piece and a through hole 112 is defined in a middle portion thereof. A first cutout 114 and a second cutout 116 are separately defined in the operating member 110 at a radial direction from the through hole 112. A locking hole 121 is defined in an end portion of the locking strip 120, and a protrusion 122 is formed on opposite end portion of the locking strip 120. The driving member 130 comprises a baseboard 140, a stopping portion 150 is bent upwardly from a long side of the baseboard 140 and a handle portion 160 is bent upwardly from a short side of the baseboard 140. A pair of slideways 141, 143 is defined in the baseboard 140 in a middle portion with parallel to the long side thereof. A positioning hole 142 is defined in the baseboard 140 in a direction of alignment with the slideway 141. A driving shaft 144 is formed on an end portion of the baseboard 140 opposite to the handle portion 160.

A plurality of standoffs 210 is formed on the base 200 for cooperating with the first and second mounting holes 15, 27. Each standoff 210 comprises a head portion 214 and a neck portion 216. A diameter of the head portion 214 is smaller than that of the first and second accommodating holes 14, 26 of the mounting holes 15, 27, and is greater than that of the first and second retaining holes 16, 28 of the mounting holes 15, 27. A diameter of the neck portion 216 is smaller than that of the first and second retaining holes 16, 28 of the mounting holes 15, 27. Alternatively, the mounting holes 15, 27 of the motherboard 10 and the supporting tray 20 can also be rectangular slots, and the standoffs 210 of the base 200 can be L-shaped clasp to cooperate with the slots. Furthermore, the mounting holes 15, 27 and the standoffs can also be other structures that can be cooperated together to assemble the motherboard 15 and the supporting tray 20 onto the base 200.

Figure 4:
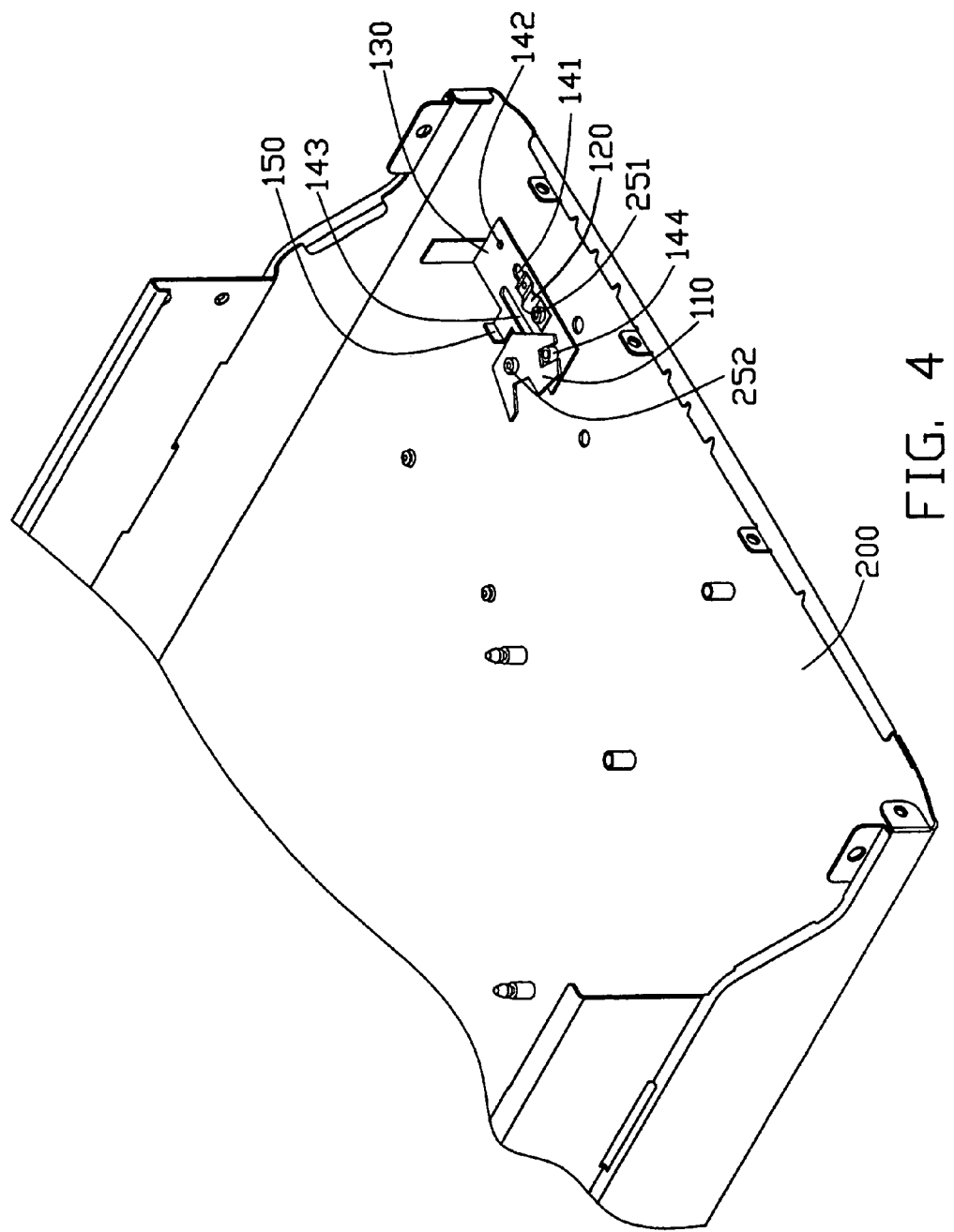
FIG. 4 is an isometric, assembled view of the locking device and the base of FIG. 1.
Figure 5:
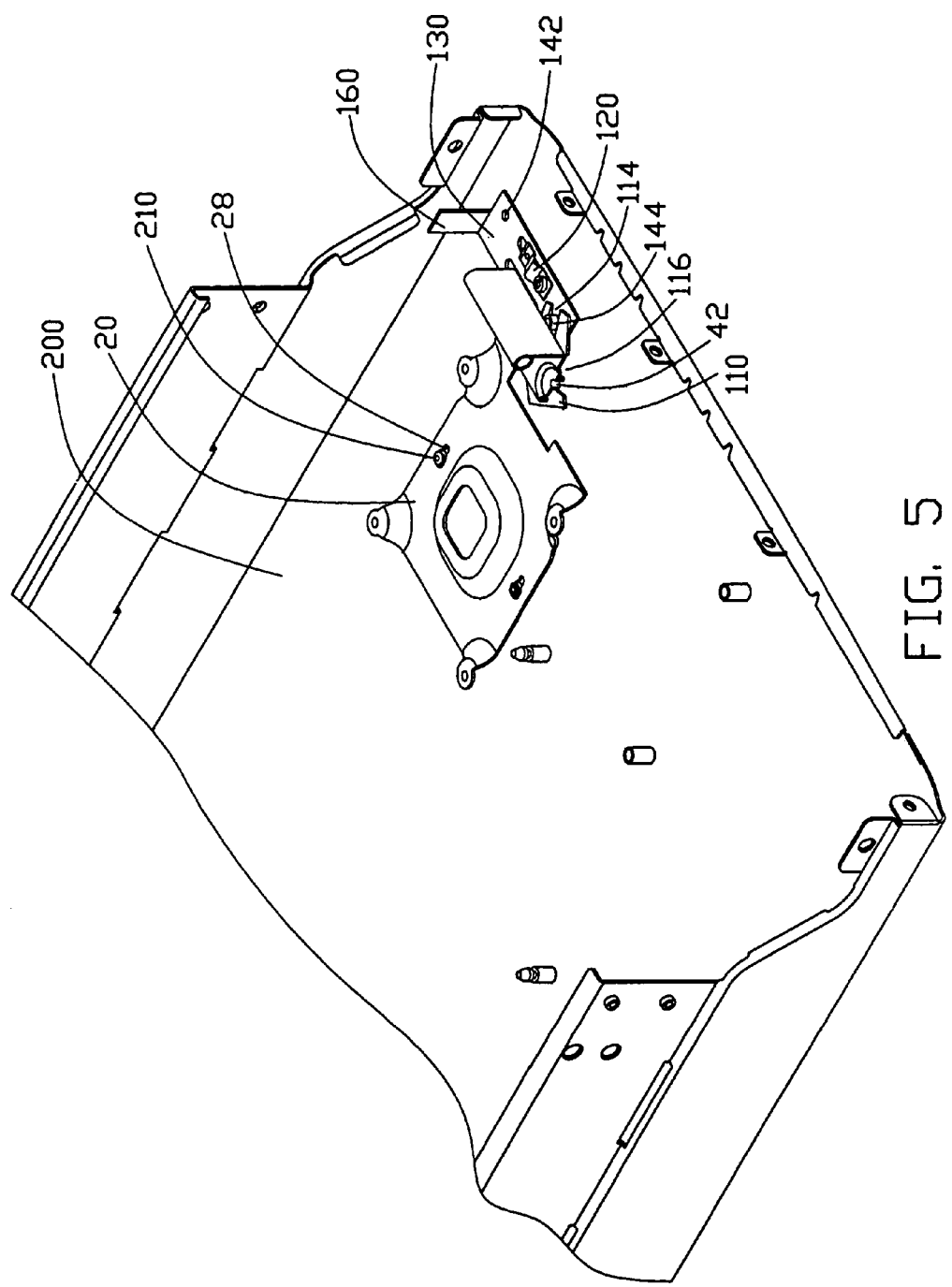
FIG. 5 is an initial assembly state view of the mounting apparatus of FIG. 1.
Figure 6:
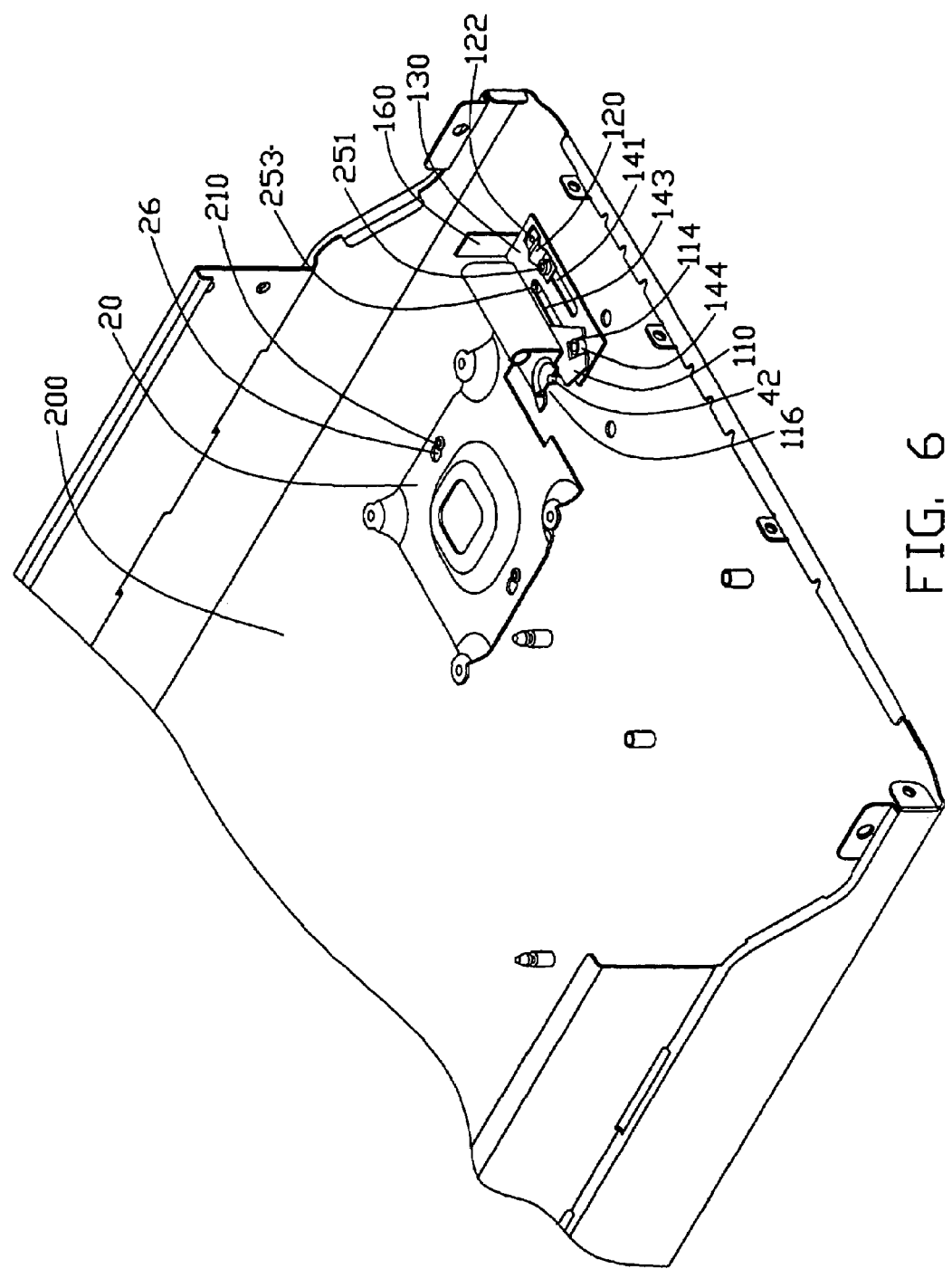
FIG. 6 is a fully assembled view of the mounting apparatus of FIG. 1.

Referring also to FIGS. 4 to 6, in assembly, the locking device 100 is firstly secured on the base 10, then the supporting tray 20 with the motherboard 10 secured thereon is put on the base 200. The steps of assembly and disassembly will be described in detail below.

In assembling the locking device 100, the driving member 130 is firstly attached on the base 200. A screw 253 extends through the slideway 143 and is engaged in the screw hole 243. After that, the locking strip 120 is put on the driving member 130 with the locking hole 121 in alignment with the slideway 141. A set of screws 251 is used to extend through the locking hole 121 and the slideway 141 and the screw hole 241 of the base 200 for securing the locking strip 120 on the base 200. At the time, the driving member 130 can slide on the base 200 along the screws 251, 253. Then a screw 252 is used to extend through the screw hole 212 of the base 200 and the through hole 112 of the operating member 110 to attach the operating member 110 on the base 200. The operating member 110 can rotate around the screw 252. At the time, the driving shaft 144 is accommodated in the first cutout 114. As shown in FIG. 4, the locking device 100 is in an initial state. After that, the motherboard 10 is secured on the supporting tray 20. Then, the supporting tray 20 with the motherboard 10 mounted thereon is put on the base 200 with the standoffs 210 extending through the first and second accommodating holes 14, 26 of the mounting holes 15, 27, respectively. At the same time, the post 42 of the supporting tray 20 is accommodated in the second cutout 116 of the operating member 110.

In operation, the handle portion 160 of the driving member 130 is pushed towards inner space of the base 200, and the slideways 141, 143 slide along the screws 251, 253. The driving shaft 144 begins to press against a side of the first cutout 114 and synchronously drives the operating member 110 to rotate around the screw 252 clockwise. Meanwhile, the post 42 of the supporting tray 20 is exerted a pressure thereon by a side of the second cutout 116 to drive the supporting tray 20 move to the inner of the base 200. The supporting tray 20 stops moving when the neck portions 216 of the standoffs 210 substantially engage in corresponding first and second retaining holes 16, 28 of the mounting holes 15, 27 of the motherboard 10 and the supporting tray 20. At the time, the stopping portion 150 of the driving member 130 presses against an inner surface of the stopping piece 44 to prevent the supporting tray 20 being over pushed. The protrusion 122 of the locking strip 120 is engaged in the positioning hole 142 of the driving member 130 to prevent the driving member 130 from moving, so as to prevent the supporting tray 20 and the motherboard 10 moving forwardly and backwardly.

In disassembly, the handle portion 160 is pulled towards an outer space of the base 200, and the slideways 141, 143 slide along the screws 251, 253. Synchronously, the driving shaft 144 begins to press against an opposite side of the first cutout 114 to drive the operating member 110 to rotate around the screw 252 anti-clockwise. Meanwhile, the post 42 of the supporting tray 20 is exerted a pressure thereon by an opposite side of the second cutout 116 to drive the supporting tray 20 move to the outer of the base 200. The supporting tray 20 stops moving when the standoffs 210 substantially engage in corresponding first and second accommodating holes 14, 26 of the mounting holes 15, 27 of the motherboard 10 and the supporting tray 20. At the time, the stopping portion 150 of the driving member 130 presses against the first bent piece 30 to prevent the supporting tray 20 being over pulled. Now times, an operator can lift the supporting tray 20 so as to disassemble the motherboard 10 from the base 200.

While the present invention has been illustrated by the description of the preferred embodiment thereof, and while the preferred embodiment has been described in considerable detail, it is not intended to restrict or in any way limit the scope of the appended claims to such detail. Additional advantages and modifications within the spirit and scope of the present invention will readily appear to those skilled in the art. Therefore, the present invention is not limited to the specific details and illustrative examples shown and described.

What is claimed is:

1. A mounting apparatus for mounting a motherboard, the mounting apparatus comprising:
   a base with a plurality of standoffs formed thereon;
   a driving member slidably attached to the base and a driving shaft formed thereon;
   an operating member pivotally attached to the base, comprising a first cutout and a second cutout, the driving shaft of the driving member engaged in the first cutout; and
   a supporting tray secured on the motherboard with a post formed thereunder, the post accommodated in the second cutout, the supporting tray comprising a plurality of first mounting holes;
   wherein after the standoffs on the base are received in corresponding first accommodating holes of the supporting tray, the driving member is pushed towards an inner space of the base to attach the motherboard to the base.

2. The mounting apparatus as described in claim 1, wherein each of the first mounting holes in generally calabash-shaped and comprises a first accommodating hole and a first retaining hole, each of the standoffs comprises a head portion and a neck portion.

3. The mounting apparatus as described in claim 2, wherein a diameter of the head portion is smaller than that of the first accommodating holes, and is greater than that of the first retaining holes, and a diameter of the neck portion is smaller than that of the first retaining hole.

4. The mounting apparatus as described in claim 1, wherein each of the first mounting holes is rectangular slot, and the standoffs of the base is L-shaped clasp.

5. The mounting apparatus as described in claim 1, wherein a slideway is defined in the driving member for the driving member sliding on the base.

6. The mounting apparatus as described in claim 5, wherein the mounting apparatus further comprises a locking strip that is located on a top of the driving member for positioning the driving member.

7. The mounting apparatus as described in claim 6, wherein a locking hole is defined in an end portion of the locking strip to cooperate with the slideway and a screw for attaching the locking strip on the base, and a protrusion is formed on opposite end portion of the locking strip to cooperate with a positioning hole of the driving member to position the driving member.

8. The mounting apparatus as described in claim 1, wherein the motherboard defines a plurality of second mounting holes therein to cooperate with the standoffs.

9. The mounting apparatus as described in claim 8, wherein each of the second mounting holes is generally calabash-shaped and comprises a second accommodating hole and a second retaining hole, each of the standoffs comprises a head portion and a neck portion.

10. The mounting apparatus as described in claim 9, wherein a diameter of the head portion is smaller than that of the second accommodating holes, and is greater than that of the second retaining holes, and a diameter of the neck portion is smaller than that of the second retaining hole.

11. The mounting apparatus as described in claim 8, wherein each of the first mounting holes is rectangular slot, and the standoffs of the base is L-shaped clasp.

12. The mounting apparatus as described in claim 1, wherein a handle portion is bent upwardly from a side of the driving member.

13. The mounting apparatus as described in claim 1, wherein a first bent piece is bent upwardly from a front portion of the supporting tray and a second bent piece is bent outwardly from a free edge of the first bent piece, the post is formed on the second bent piece and a stopping piece is formed downwardly from the second bent piece.

14. The mounting apparatus as described in claim 13, wherein a stopping portion is bent upwardly from a long side of the driving member, the stopping portion moves between the first bent piece and the stopping piece.

15. A motherboard mounting system comprising:
base with at least one first engaging means arranged thereon;
a locking device comprising a driving member and an operating member, the driving member slidably attached to the base and having a driving shaft formed thereon, the operating member pivotally attached to the base and defining a first cutout for receiving the driving shaft, and a second cutout;
a motherboard;
a supporting tray secured to the motherboard, a post depending from the supporting tray and received in the second cutout of the operating member; and
at least one second engaging means arranged in at least one of the mother board and the supporting tray;
wherein when the driving member is slid along a first direction, the operating member is rotated to drive the supporting tray and the motherboard to slide in a second direction perpendicular to the first direction so as to engage said first engaging means to said second engaging means.

16. The mounting apparatus as described in claim 12, wherein the first engaging means are standoffs.

17. The mounting apparatus as described in claim 13, wherein the second engaging means are holes.

18. A mounting apparatus for mounting a circuit board to a device chassis, comprising:
a driving member attached to said chassis and movable along a first direction; and
a supporting tray secured with said circuit board to form a subassembly and movable along a second direction with said circuit board as said subassembly from one position where said subassembly is securely fixed to said chassis to another position where said subassembly is movable away from said chassis along a third direction different from said first and second directions, said supporting tray reachable by said driving member, and said subassembly drivable from said one position to said another position by means of movement of said driving member along said first direction.

19. The mounting apparatus as described in claim 18, further comprising an operating member pivotally attached to said chassis and comprising a first cutout and a second cutout to engage with said driving member and said supporting tray respectively.

20. The mounting apparatus as described in claim 18, wherein said chassis has a plurality of standoffs formed thereon to securely fix said subassembly along said third direction.

21. The mounting apparatus as described in claim 18, wherein said movement of said driving member along said first direction is controllable by a locking strip formed on said driving member.

\* \* \* \* \*